United States Patent
Kushino et al.

(10) Patent No.: US 7,086,980 B2
(45) Date of Patent: Aug. 8, 2006

(54) COMBINATION OF DRIVE POWER TRANSMISSION DEVICE AND DIFFERENTIAL GEAR AND MANUFACTURING METHOD THEREFOR

(75) Inventors: Hiroshi Kushino, Obu (JP); Hiroshi Takuno, Aichi-ken (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 101 days.

(21) Appl. No.: 10/807,301

(22) Filed: Mar. 24, 2004

(65) Prior Publication Data

US 2005/0020396 A1    Jan. 27, 2005

(30) Foreign Application Priority Data

Apr. 30, 2003    (JP) ............................. 2003-125365

(51) Int. Cl.
*F16H 37/08* (2006.01)
*F16H 33/00* (2006.01)
*B25B 27/14* (2006.01)

(52) U.S. Cl. ........................ 475/198; 475/221; 29/274; 74/640

(58) Field of Classification Search .................. 192/35, 192/70.23, 84.7, 84.91; 475/231, 150; 29/274
See application file for complete search history.

(56) References Cited

U.S. PATENT DOCUMENTS

| | | | | |
|---|---|---|---|---|
| 3,073,424 A | * | 1/1963 | Russell ................. | 192/113.36 |
| 3,650,013 A | * | 3/1972 | Boers et al. ................. | 29/893 |
| 3,686,739 A | * | 8/1972 | Manero ........................ | 29/274 |
| 4,231,147 A | * | 11/1980 | Witt ............................. | 29/433 |
| 4,255,839 A | * | 3/1981 | Shea ............................ | 29/274 |
| 4,690,258 A | * | 9/1987 | Teraoka et al. ................ | 192/57 |
| 5,042,135 A | * | 8/1991 | Kroninger et al. ............. | 29/467 |
| 5,083,986 A | * | 1/1992 | Teraoka et al. ................ | 475/86 |
| 5,295,291 A | * | 3/1994 | Harris ........................... | 29/274 |
| 5,713,119 A | * | 2/1998 | Lagatta ......................... | 29/464 |
| 6,530,460 B1 | * | 3/2003 | Gradu ........................... | 192/35 |
| 6,585,094 B1 | * | 7/2003 | Okude et al. ................. | 192/35 |
| 6,622,838 B1 | | 9/2003 | Suzuki | |

\* cited by examiner

*Primary Examiner*—Tisha Lewis
(74) *Attorney, Agent, or Firm*—Oblon, Spivak, McClelland, Maier & Neustadt, P.C.

(57) ABSTRACT

Disclosed are a combination of a drive power transmission device and a differential gear, which combination is decreased in the number of parts, increased in rigidity and reduced in weight as well as in manufacturing cost, and a method of manufacturing the combination. A gear shaft which is provided with a drive gear for a differential gear is rotatably supported in a differential case. The differential case is provided with a partition wall portion which extends outwardly from an opening end portion thereof from which the gear shaft protrudes. A clutch case is secured to the circumferential edge portion of the partition wall portion thereby to define a housing chamber. A housing with a clutch receiving chamber formed therein is rotatably supported on the clutch case inside the housing chamber. In the clutch receiving chamber, outer clutch plates are engaged at outer circumferential portions thereof with the internal surface of the housing to be bodily rotatably but axially movable relative thereto, while inner clutch plates arranged in an alternate fashion with the outer clutch plates are engaged at internal surface portions thereof with an engaging portion of the gear shaft to be bodily rotatable but axially movable relative thereto. Thus, the inner clutch plates are drivingly connected directly with the gear shaft without using any inner shaft which would otherwise be necessary to support the inner clutch plates bodily rotatably and axially movably relative thereto in the housing.

4 Claims, 3 Drawing Sheets

(12)  United States Patent

COMBINATION OF DRIVE POWER TRANSMISSION DEVICE AND DIFFERENTIAL GEAR AND MANUFACTURING METHOD THEREFOR

INCORPORATION BY REFERENCE

This application is based on and claims priority under 35 U.S.C. sctn. 119 with respect to Japanese Application No. 2003-125365 filed on Apr. 30, 2003, the entire content of which is incorporated herein by reference.

BACKGROUND OF THE INVENTION

1. Field of the Invention

The present invention relates to a combination of a drive power transmission device and a differential gear wherein the drive power transmission device is bodily assembled to the differential gear. It also relates to a method of manufacturing the combination.

2. Discussion of the Related Art

Heretofore, as described in U.S. Pat. No. 6,622,838 B2 to K. Suzuki, there has been known a drive power transmission device, wherein a gear shaft with a drive gear for a differential gear is carried by a differential case to be rotatable on a rotational axis thereof, and a clutch case is secured to the differential case. A main or front housing is rotatably carried in the clutch case, and in a clutch receiving chamber inside the front housing, an inner shaft is carried by means of bearings to be rotatable on the rotational axis. A gear shaft is spline-engaged with the inner shaft. A main clutch, a cam-operated amplifying mechanism, a pilot clutch and the like are arranged within the clutch receiving chamber for selectively drivingly connecting the front housing with the inner shaft. The opening end portion of the front housing is covered with a rear housing. An electromagnet is held by a yoke secured to the differential case and is located at a position which is opposed to the pilot clutch with the rear housing therebetween.

However, in the aforementioned drive power transmission device, the inner shaft is supported by means of the bearings within the clutch receiving chamber which is inside the front housing, and the gear shaft which is provided with the drive gear for the differential gear is inserted into the inner shaft through spline engagement. With this configuration, the drive power transmission device section for controlling the torque transmission to driven wheels through clutch operation is functionally separated at the spline engagement section from the differential gear section for the driven wheels. Thus, such mechanical configuration is advantageous because the sections can be manufactured and tested individually and can be assembled to each other thereafter. However, such mechanical configuration disadvantageously increases the number of the parts and the manufacturing cost and gains the weight.

SUMMARY OF THE INVENTION

Accordingly, it is a primary object of the present invention to provide an improved combination of a drive power transmission device and a differential gear which combination is capable of being small in the number of parts, high in rigidity, light in weight and low in cost.

Another object of the present invention is to provide an improved method of manufacturing the combination of the character set forth above.

Briefly, according to the first aspect of the present invention, there is provided a combination of a drive power transmission device and a differential gear wherein the drive power transmission device for controlling the torque transmission form a propeller shaft to driven wheels through friction engagement of a clutch in a four-wheel drive vehicle is combined bodily with the differential gear for the driven wheels. In the combination, a bottomed, cylindrical housing of the drive power transmission device has a clutch receiving chamber therein and is connected to the propeller shaft. A gear shaft is provided at one shaft end thereof with a drive gear for the differential gear and is received at the other shaft end portion thereof into the housing. The clutch received in the clutch receiving chamber includes a plurality of outer clutch plates engaged with the internal surface of the clutch receiving chamber to be rotatable bodily with the housing but axially movable relative thereto and a plurality of inner clutch plates engaged with an engaging portion formed on the gear shaft to be rotatable bodily with the gear shaft but axially movable relative thereto. The out clutch plates are arranged in an alternate fashion with respect to the inner clutch plates. A clutch operating device is further provided for bringing the outer and inner clutch plates selectively into and out of friction engagement.

With this configuration, when the clutch operating device is operated to bring the outer and inner clutch plates into friction engagement, the rotation of the housing is transmitted smoothly and directly to the gear shaft through the engagement between the internal surface of the clutch receiving chamber and the outer clutch plates, the friction engagement between the outer and inner clutch plates and the engagement between the inner clutch plates and the engaging portion of the gear shaft and further from the gear shaft to the differential gear through the drive gear on the gear shaft. Since the inner clutch plats are rotationally engaged directly with the gear shaft, there can be omitted any inner shaft which is provided in the prior art device for supporting and engaging the inner clutch plates thereon, and there is also omitted any means for rotatably supporting any such inner shaft on the housing of the drive power transmission device. Accordingly, the combination of the drive power transmission device with the differential gear can be decreased in the number of parts, increased in rigidity, and reduced in weight as well as manufacturing cost.

In another aspect of the present invention, there is provided a method of manufacturing the combination which is constituted as set forth in the first aspect of the present invention. In the manufacturing method, a reference bore is formed at a bottom surface of the housing coaxially of the rotational axis, and an assembling tool is provided having at one end thereof a fitting portion adapted to be inserted into the reference bore and an engaging portion with which the inner clutch plates are engageable to be bodily rotatable but axially movable relative thereto. The assembling tool is inserted at the fitting portion into the reference bore of the housing with the axis of the assembling tool extending coaxially of the rotational axis. The outer clutch plates and the inner clutch plates are then received successively in the clutch receiving chamber while the outer clutch plates are engaged non-rotatably but axially movably with the internal surface of the clutch receiving chamber and while the inner clutch plates are engaged non-rotatably but axially movably with the engaging portion of the assembling tool. The assembling tool is then removed from the housing, with the outer and inner clutch plates remaining received in the housing and being preliminarily pressed on each other. After removal of the assembling tool, the gear shaft protruding from the differential gear is inserted instead into the space from which the assembling tool has been removed, while the inner clutch plates are brought into engagement with the engaging portion of the gear shaft so that the inner clutch plates are bodily rotatable with the gear shaft but axially movable relative thereto.

In the method as implemented above, the assembling tool is secured to the housing inside the clutch receiving chamber thereof by being inserted at its fitting portion of one end thereof into the reference bore formed at the bottom surface of the housing. In this state, the outer and inner clutch plates arranged in the alternate fashion are assembled into the clutch receiving chamber to be engaged respectively with the internal surface of the clutch receiving chamber and the engaging portion of the assembling tool. Therefore, it can be realized that after removal of the assembling tool from the housing, the outer and inner clutch plates can be engaged efficiently and easily with the internal surface of the clutch receiving chamber and the engaging portion of the gear shaft which is inserted into the space from which the assembling tool has been removed.

BRIEF DESCRIPTION OF THE ACCOMPANYING DRAWINGS

The foregoing and other objects and many of the attendant advantages of the present invention may readily be appreciated as the same becomes better understood by reference to the preferred embodiment of the present invention when considered in connection with the accompanying drawings, wherein like reference numerals designate the same or corresponding parts throughout several views, and in which.

DETAILED DESCRIPTION OF THE PREFERRED EMBODIMENT

Figure 1:
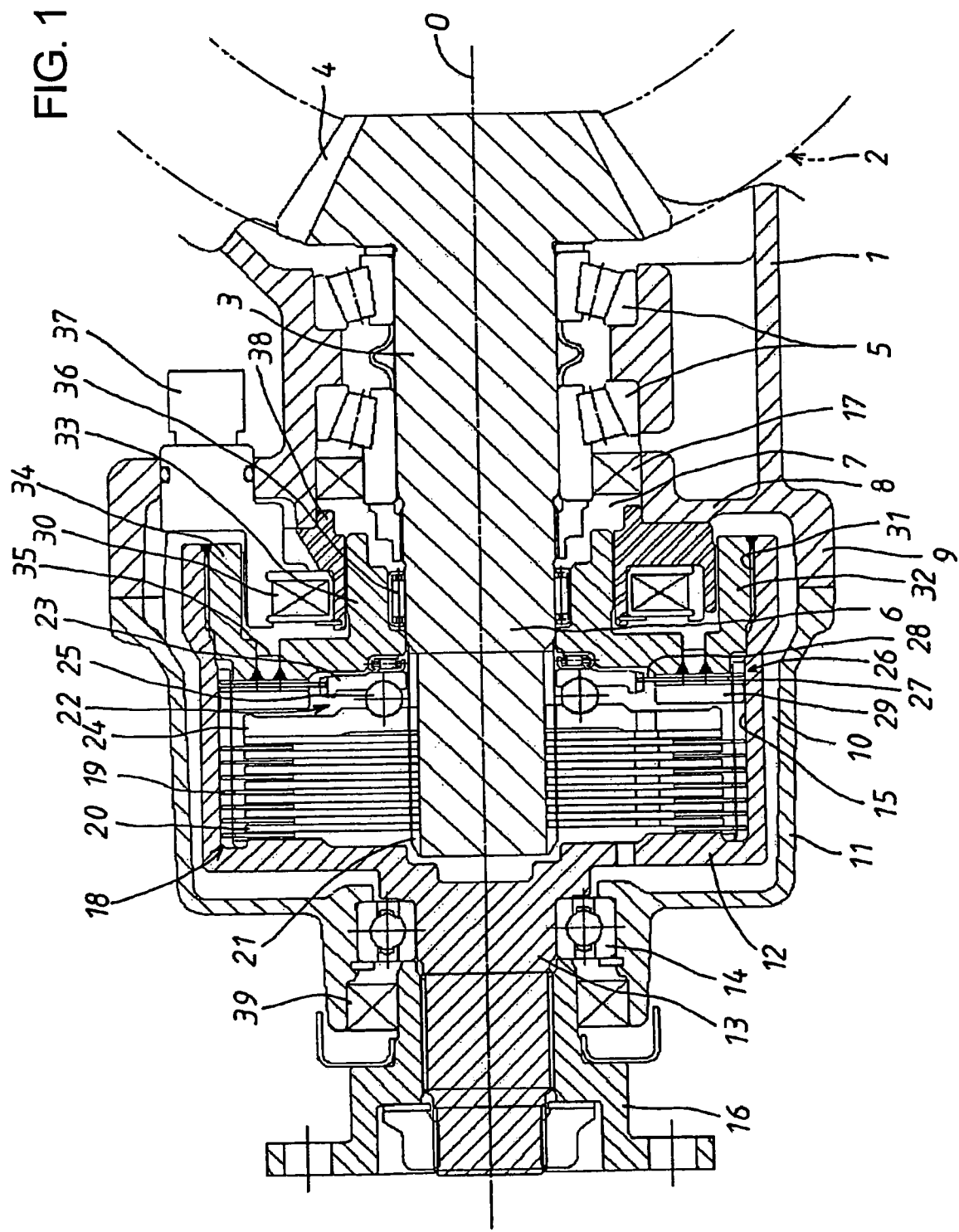
FIG. 1 is a longitudinal sectional view of a combination of a drive power transmission device and a differential gear in one embodiment according to the present invention.

A combination of a drive power transmission device and a differential gear and a method of manufacturing the combination in one embodiment according to the present invention will be described with reference to the accompanying drawings. Referring now to the drawings and particularly, to FIG. 1 thereof, a numeral 1 denotes a differential case for driven wheels (not shown) of a four-wheel drive vehicle, and a differential gear 2 is housed in the differential case 1. A numeral 3 denotes a gear shaft, which is provided at one end thereof with a drive gear 4 such as, for example, hypoid gear or the like constituting the differential gear 2. The gear shaft 3 is supported by a pair of roller bearings 5 in the differential case 1 to be rotatable on a rotational axis (O). The gear shaft 3 is fluid-tightly sealed by a sealing element 17 at a portion close to an opening end portion 7 of the differential case 1 and protrudes its shaft end portion from the opening end portion 7 outwardly of the differential case 1. The differential case 1 has formed a partition wall portion 8, which extends outwardly from the opening end portion 7 in a direction perpendicular to the rotational axis (O). The partition wall portion 8 is provided at the outer circumferential portion thereof with a circumferential edge portion 9, which is bent at right angle to extend in a direction going away from the differential case 1, that is, in a direction parallel to the rotational axis (O). A clutch case 11 which forms a housing chamber together with the partition wall portion 8 is secured by means of bolts (not shown) to the end surface of the circumferential edge portion 9. A main or front housing 12 of a bottomed, cylindrical shape is supported at an input shaft portion 13 thereof by means of bearing 14 in the housing chamber 10 of the clutch case 11 to be rotatable on the rotational axis (O). A clutch receiving chamber 15 is formed in the front housing 12. An external spline is formed at the end portion of the input shaft portion 13 and is in spline-engagement with an internal spline formed at the internal surface of a flanged connection member 16 which is adapted to be connected to a propeller shaft (not shown). A sealing element 39 is attached between the flanged, cylindrical connection member 16 and the clutch case 11 to prevent foreign matter from entering from the outside of the clutch case 11 as well as to prevent clutch lubricant oil contained in the housing chamber 10 from leaking out of the same.

A main clutch 18 is arranged in the clutch receiving chamber 15. The main clutch 18 is a wet-type multiple plate clutch and is composed of plural outer main clutch plates 19 and plural inner main clutch plates 20. The outer main clutch plates 19 are spline-engaged with the inner spline internal surface of the clutch receiving chamber 15 to be bodily rotatable but axially movable relative thereto. The inner main clutch plates 20 are spline-engaged with an external spline engaging portion 21 formed on the shaft end portion 6 which is the other end of the gear shaft 3 provided with the drive gear 4 at one end thereof and are bodily movable but axially movable relative to the engaging portion 21. The outer main clutch plates 19 and the inner main clutch plates 20 are arranged in an alternate fashion with each other. The outer main clutch plates 19 and the inner main clutch plates 20 are brought into friction engagement with each other when pressured, but are brought out of engagement when not pressured.

A cam-type amplifying mechanism 22 is arranged behind the main clutch 18 and is composed of a first cam member 23, a second cam member 24 and a plurality of ball-like cam followers 25. The second cam member 24 is in abutting engagement at one end surface thereof with the main clutch 18 with an internal spline portion thereof being spline-engaged with the engaging portion 21 of the gear shaft 3 and is able to be pressured by a cam action upon the main clutch 18. The first cam member 23 is held freely rotatable on the engaging portion 21 (i.e., on the gear shaft 3) behind the second cam member 24 with the plural cam followers 25 therebetween and is located at the radial inside of a pilot clutch 26 referred to later. The plural cam followers 25 are respectively held in cam grooves which are formed between the first and second cam members 23, 24.

The pilot clutch 26 is composed of several or two outer pilot clutch plates 27 and one inner pilot clutch 28 therebetween and is located behind the second cam member 24. The outer pilot clutch plates 27 are spline-engaged with the internal surface of the clutch receiving chamber 15 to be bodily rotatable but axially movably relative to the front housing 12. The inner pilot clutch plate 28 is spline-engaged with the outer surface of the first cam member 23 to be rotatable bodily but axially movable relative thereto. An armature 29 takes an annular shape and is arranged between the pilot clutch 26 and the second cam member 24. The armature 29 is assembled to be spline-engaged with the internal surface of the clutch receiving chamber 15 and is bodily rotatable with the front housing 12 but axially movable relative thereto. The armature 29 is attracted by a magnetic flux which is formed to start from a later mentioned electromagnet 30 to bring the pilot clutch 26 into pressuring contact.

A rear housing 32 is secured to the opening end portion 31 of the front housing 12 behind the pilot clutch 26 to close the opening end portion 31 of the front housing 12. The rear housing 32 is composed of a small-diameter rear housing portion 33, a large-diameter rear housing portion 34 and an intermediate portion 35. The small-diameter rear housing portion 33 takes a stepped, cylindrical shape and is rotatably carried by means of a needle bearing 36 on the shaft end portion 6 of the gear shaft 3. The large-diameter rear housing portion 34 also takes a stepped, cylindrical shape and is arranged around the small-diameter rear housing portion 33 with a predetermined radial space therebetween. The intermediate portion 35 takes an annular shape and is made of a stainless steel as a non-magnetic material. The intermediate portion 35 is interposed between the internal surface of the large-diameter rear housing portion 34 and the external surface of the small-diameter rear housing portion 33 and is bodily joined by welding with the small and large-diameter rear housing portions 33, 34. The large-diameter rear housing portion 34 screwed into a female screw which is formed at the internal surface of the opening end portion 31 of the front housing 12 and is secured by welding to the front housing 12 with the rear housing 12 preliminarily pressuring the main clutch 18 through the cam-type amplifying mechanism 22. The small and large-diameter rear housing portions 33, 34 are made of a magnetic material, while the intermediate member is made of the non-magnetic material, so that there is formed a construction which makes the magnetic flux from the electromagnet 30 easier to be formed.

The electromagnetic 30 of an annular shape to which an electric current is applied through a terminal member 37 is secured to and held by a yoke 38 within a space which is surrounded by the small and large-diameter rear housing portions 33, 34 and the intermediate portion 35. The yoke 38 is secured to the end surface of the opening end portion 7 of the differential case 1 between the small and large-diameter rear housing members 33, 34 with minute clearances relative thereto. The electromagnet 30, the cam-type amplifying mechanism 22, the pilot clutch 26 and the like constitute a clutch operating device for bringing the main clutch 18 selectively into and out of engagement.

The operation of the combination of the drive power transmission device and the differential gear as constructed above will be described hereinafter. The combination is arranged on a drive train which transmits the drive power from a prime mover (e.g., combustion engine) to rear wheels (both not shown) in the four-wheel drive vehicle. Upon the starting of the engine of the vehicle, the output of the engine is transmitted to the input shaft portion 13 of the front housing 12 through a propeller shaft (not shown) and the flanged connection member 16, and the front housing 12 is therefore rotated. At the time of engine starting, usually, no electric current is applied to the electromagnet 30, which therefore does not form any magnetic flux. Thus, the pilot clutch 26 remains in the state of disengagement, and no pressuring force acts on the second cam member 24. This keeps the outer main clutch plates 19 and the inner main clutch plates 20 not pressured upon each other. Thus, the outer main clutch plates 19 and the inner main clutch plates 20 are rotated relative to each other, so that no substantial torque is transmitted from the front housing 12 to the gear shaft 3.

When an electric current is applied to the electromagnetic 30, a magnetic flux is formed to start from the electromagnet 30. The magnetic flux circulates from the electromagnet 30 to the yoke 38, from the yoke 38 to the small-diameter rear housing portion 33, from the small-diameter rear housing portion 33 through the pilot clutch 26 to the armature 29, from the armature 29 to the large-diameter rear housing portion 34, from the large-diameter rear housing portion 34 to the outer circumferential portion of the yoke 38 and from the yoke 38 to the electromagnet 30 and attracts the armature 29 toward the rear housing 32. When so attracted, the armature 29 is pressured on the pilot clutch 26 thereby to bring the same into friction engagement. Thus, relative rotation is generated between the first cam member 23 and the second cam member 24 of the cam-type amplifying mechanism 22, and by the cooperation of the cam followers 25 and the cam grooves, the second cam member 24 is moved to effect the pressuring contact between the outer main clutch plates 19 and the inner main clutch plates 20. As a consequence, the main clutch 18 generates a transmission torque to which the friction engaging force of the pilot clutch 26 is amplified. The transmission torque is transmitted from the rotating front housing 12 to the engaging portion 21 of the gear shaft 3 and is further transmitted from the gear shaft 3 through the differential gear 2 to the driven wheels (usually, rear wheels) of the four-wheel drive vehicle.

As described hereinabove, in the combination of the drive power transmission device and the differential gear in the embodiment according to the present invention, the drive gear 4 for the differential gear 2 is provided at one end of the gear shaft 3, and the inner main clutch plates 20 are spline-engaged with the engaging portion 21 formed at the shaft end portion 6 which is located at the other end of the gear shaft 3. Accordingly, in assembling the gear shaft 3, it may be conceived to implement either of the following methods (1) and (2).

(1) In the state that the shaft end portion 6 of the gear shaft 3 is located in the housing 12, the outer main clutch plates 19 and the inner main clutch plates 20 are inserted into the housing 12 alternately one after another to be spline-engaged with the internal surface of the clutch receiving chamber 15 and with the engaging portion 21 of the gear shaft 3. Thereafter, the cam-type amplifying mechanism 22, the pilot clutch 26, the electromagnet 30 and the like are in turn assembled into the front housing 12, after which the differential gear 2 is assembled to the drive gear 4.

(2) The differential gear 2 first has the drive gear 4 assembled thereto, and the cam-type amplifying mechanism 22, the pilot clutch 26, the electromagnet 30 and the like are then assembled to the gear shaft 3. Thereafter, the outer main clutch plates 19 and the inner main clutch plates 20 are brought into spline-engagements respectively with the internal spline surface of the clutch receiving chamber 15 and the engaging portion 21 of the gear shaft 3.

However, in the method (1), because the outer diameter of the drive gear 4 is larger in diameter than the gear shaft 3 to which the cam-type amplifying mechanism 22 and the like are assembled, the main clutch plates 19, 20, the cam-type amplifying mechanism 22 and the like have to have been provisionally or temporally assembled onto the gear shaft 3 prior to inserting the shaft end portion 6 into the front housing 12. In this state, it is hard to bring the outer main clutch plates 19 into spline-engagement with the internal surface of the clutch receiving chamber 15. Although it may be conceived to make the drive gear 4 as a discrete member separated from the gear shaft 3 and to assemble the drive gear 4 finally to the gear shaft 3, such an idea would result in increased assembling steps, a larger size mechanism and heavier weight.

In the method (2), on the other hand, engaging the outer main clutch plates 19 with the internal surface of the clutch receiving chamber 15 must be done in parallel time or simultaneous relation with screwing the large-diameter rear housing portion 34 into the internal surface of the opening end portion 31 of the front housing 12. In fact, these assembling steps are extraordinarily hard to do.

The manufacturing method in this particular embodiment is devised in view of the foregoing drawbacks. Next, the method of manufacturing the combination of the drive power transmission device and the differential gear by the use of an assembling tool will be described with reference to FIGS. 2 and 3.

Figure 2:
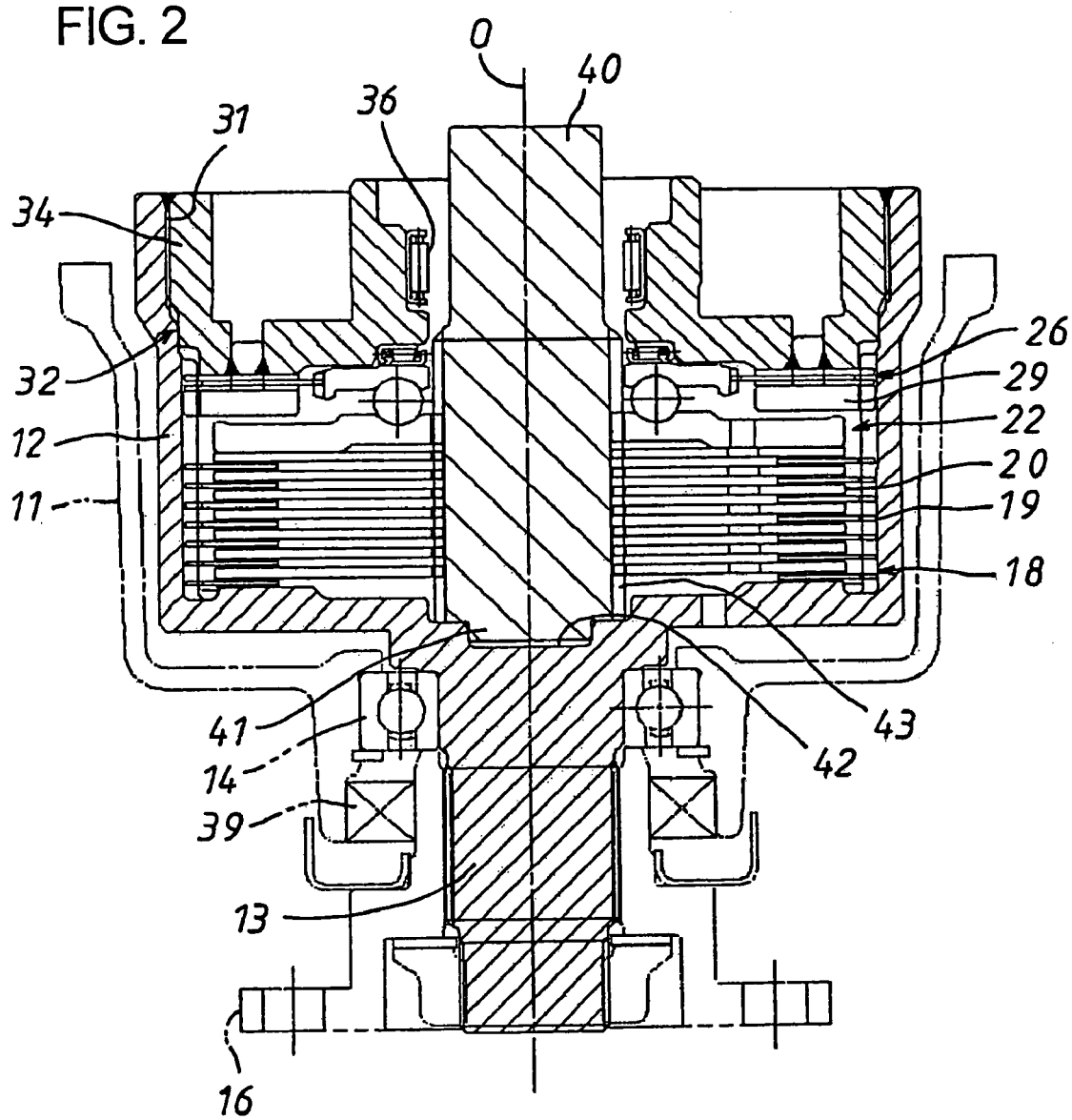
FIG. 2 is a longitudinal sectional view of the drive power transmission device on the way to assembling a main clutch.

As shown in FIG. 2, a reference bore 42 in which an assembling tool 40 is to be fit at its one end is formed at the bottom surface of the front housing 12 in axial alignment with the rotational axis (O). A spline is formed as an engaging portion 43 at a large-diameter end portion of the tool 40 for enabling the inner main clutch plates 20 to be engaged therewith rotatably bodily but axially movably relative thereto. In assembling, the front housing 12 is held on a jig or fixture (not shown) in a vertical position with the rotational axis (O) thereof extending vertically, and the assembling tool 40 is inserted at its fitting portion 41 into the reference bore 42 of the front housing 12 with the axis thereof extending in coaxial alignment with the rotational axis (O).

Subsequently, the outer main clutch plates 19 and the inner main clutch plates 20 are arranged alternately and are inserted in the front housing 12 as the assembling tool 40 passes therethrough so that they are brought into spline engagement respectively with the internal surface of the clutch receiving chamber 15 and the engaging portion 43. Then, the cam-type amplifying mechanism 22, the armature 29 and the pilot clutch 26 are in turn placed on the main clutch 18, and then, the rear housing 32 is screwed at the large-diameter rear housing portion 34 into the opening end portion 31 of the front housing 12 until the main clutch 18 is preliminarily pressured by the small-diameter rear housing portion 33 through the cam-type amplifying mechanism 22. In this state, the large-diameter rear hosing portion 34 is secured by welding to the front housing 32. Thereafter, the front housing 12 is released from the holding by the jig or fixture and is inserted into the clutch case 11 to have its input shaft portion 13 rotatably supported in the clutch case 11 through the bearing 14. The flanged connection member 16 is then spline-engaged with the input shaft portion 13 as the sealing element 39 is interposed between the clutch case 11 and the flanged connection member 16. The flanged connection member 16 is then secured to the input shaft portion 13 by screwing the nut on the male screw portion formed on the end portion of the input shaft portion 13.

Figure 3:
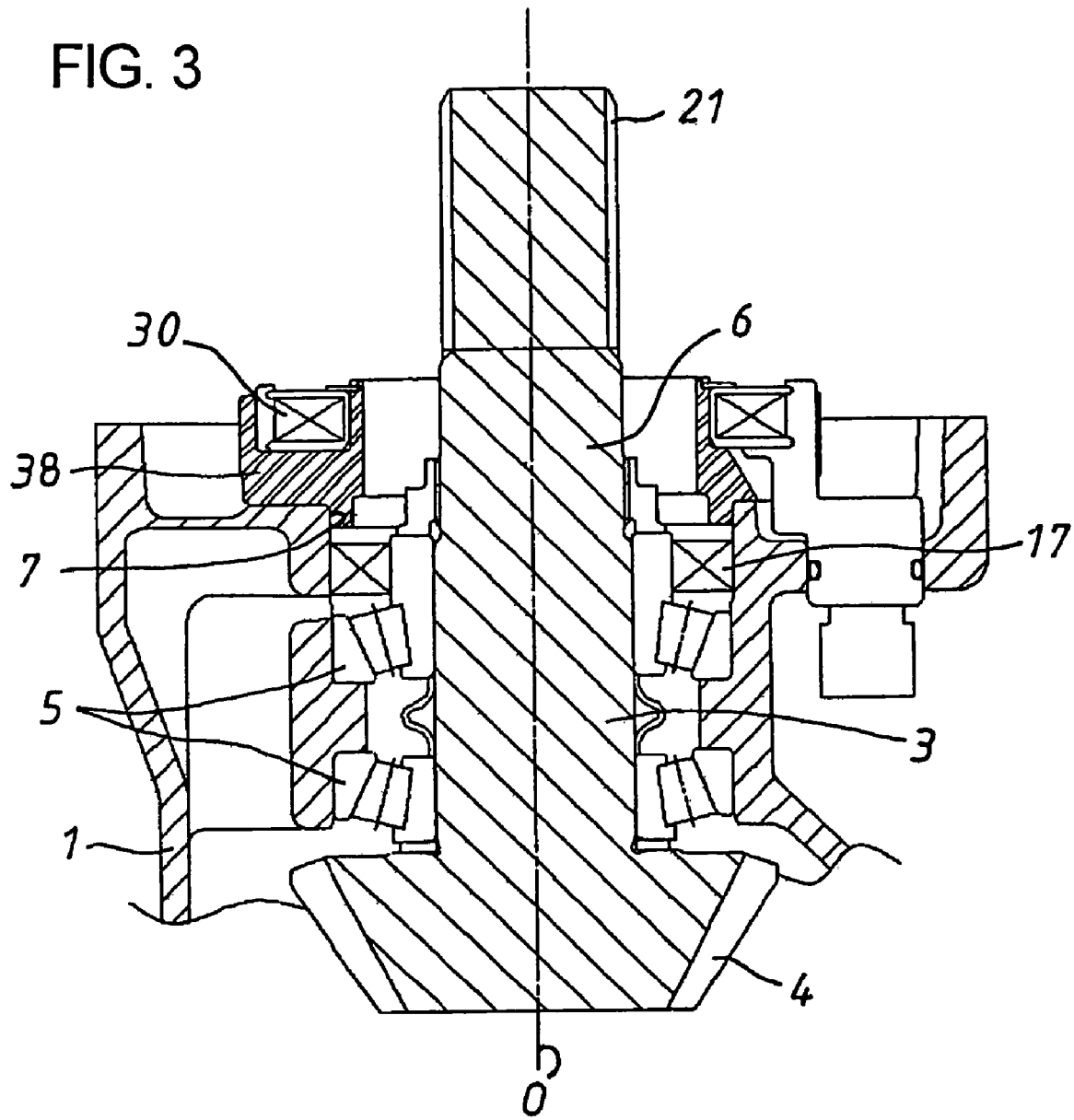
FIG. 3 is a fragmentary sectional view of the differential gear having a gear shaft, a yoke and the like assembled to a differential case.

On the other hand, as shown in FIG. 3, the differential case 1 has rotatably supported therein the gear shaft 3 by means of the roller bearings 5. The shaft end portion 6 of the gear shaft 3 is fluid-tightly sealed by the sealing element 17 and is protruded outwardly from the differential case 1 on the rotational axis (O). The yoke 38 having the electromagnet 30 held thereon is secured to the end surface of the opening end portion 7 of the differential case 1. After the assembling tool 40 is removed from the front housing 12, the rear housing 32 secured to the front housing 12 which is rotatably supported in the clutch case 11 is brought into fitting on the shaft end portion 6 of the gear shaft 3 through the needle bearing 36 as, at the same time, the inner clutch plates 20 are brought into spline engagement with the engaging portion 21 of the gear shaft 3. Then, the clutch case 11 is put on the circumferential edge portion 9 of the partition wall portion 8 of the differential case 1 and is secured by means of the bolts (not shown) to the same. In the aforementioned manner, the assembling of the clutch case 11 rotatably supporting the housing 12 to the differential gear 2 rotatably supporting the gear shaft 3 is carried out to complete the combination of the drive power transmission device and the differential gear as shown in FIG. 1.

It is to be noted that the outer clutch plates in the claimed invention correspond to the outer main clutch plates 19 in the illustrated embodiment, while the inner clutch plates in the claimed invention correspond to the inner main clutch plates 20 in the illustrated embodiment. It is further to be noted that throughout the present specification, the word "clutch plates" generally designates both of the outer clutch plates 19 and the inner clutch plates 20.

Lastly, various features and many of the attendant advantages in the foregoing embodiment will be summarized as follows:

In the combination of the drive power transmission device and the differential gear in the first aspect of the forgoing embodiment, as shown in FIG. 1, when the clutch operating device (30, 22, 26) is operated to bring the outer and inner clutch plates 19, 20 into friction engagement, the rotation of the front housing 12 is transmitted smoothly and directly to the gear shaft 3 through the engagement between the internal surface of the clutch receiving chamber 15 and the outer clutch plates 19, the friction engagement between the outer and inner clutch plates 19, 20 and the engagement between the inner clutch plates 20 and the engaging portion 21 of the gear shaft 3 and further to the differential gear 2 through the drive gear 4 on the gear shaft 3. Since the inner clutch plats 20 are rotationally engaged directly with the gear shaft 3, there can be omitted any inner shaft which is provided in the prior art device for supporting and engaging the inner clutch plates 20 thereon, and there is also omitted any means for rotatably supporting any such inner shaft on the front housing 12 of the drive power transmission device. Accordingly, the combination of the drive power transmission device and the differential gear can be decreased in the number of parts, increased in rigidity, and reduced in weight as well as manufacturing cost.

In the combination of the drive power transmission device and the differential gear in the second aspect of the forgoing embodiment, when the electromagnet 30 is excited to bring the pilot clutch 26 into friction engagement, the relative rotation is effected between the first cam member 23 and the second cam member 24, and the second cam member 24 is axially moved by the cam action thereby to bring the outer main clutch plates 19 and the inner main clutch plates 20 into friction engagement. Thus, the rotation of the front housing 12 is transmitted smoothly and directly to the gear shaft 3 through the engagement between the internal surface of the clutch receiving chamber 15 and the outer clutch plates 19, the friction engagement between the outer and inner clutch plates 19, 20 and the engagement between the inner clutch plates 20 and the engaging portion 21 of the gear shaft 3 and further from the gear shaft 3 to the differential gear 2 through the drive gear 4 on the gear shaft 3. Since the inner clutch plats 20 are rotationally engaged directly with the gear shaft 3, there can be omitted any inner shaft which is provided in the prior art device for supporting and engaging the inner clutch plates 20 thereon, and there is also omitted any means for rotatably supporting any such inner shaft on the front housing 12 of the drive power transmission device. Accordingly, the assembly of the drive power transmission device with the differential gear can be decreased in the number of parts, increased in rigidity, and reduced in weight as well as manufacturing cost. Further, the partition wall portion 8 is formed on the differential case 1 to extend from the circumferential edge portion 9 of the opening end portion 7 beyond which the shaft end portion 6 of the gear shaft 3 protrudes. The clutch case 11 is put on, and secured to, the circumferential edge portion 9 of the partition wall portion 8 thereby to define the housing chamber 10, and the front housing 12 is rotatably supported on the clutch case 11 inside the housing chamber 10. Therefore, the inner main clutch plates 20 can be engaged with the shaft end portion of the gear shaft 3 in a construction which is simplified and increased in rigidity.

In the third aspect of the foregoing embodiment, there is provided a method of manufacturing the combination which is constituted as defined in the first aspect of the foregoing embodiment. In the method, the assembling tool 40 is temporally secured to the front housing 12 inside the clutch receiving chamber 15 thereof by being inserted at its fitting portion 41 of one end thereof into the reference bore 42 formed at the bottom surface of the front housing 12. In this state, the outer and inner clutch plates 19, 20 arranged in the alternate fashion are assembled into the clutch receiving chamber 15 to be engaged respectively with the internal surface of the clutch receiving chamber 15 and the engaging portion 43 of the assembling tool 40. Therefore, it can be realized that after removal of the assembling tool 40 from the front housing 12, the outer and inner clutch plates 19, 20 can be assembled efficiently and easily to the internal surface of the clutch receiving chamber 15 and the engaging portion 21 of the gear shaft 3 which is inserted into the space from which the assembling tool 40 has been removed.

In the fourth aspect of the foregoing embodiment, there is provided a method of manufacturing the combination which is constituted as defined in the second aspect of the foregoing embodiment. In the method, the assembling tool 40 is temporally secured to the front housing 12 inside the clutch receiving chamber 15 thereof by being inserted at its fitting portion 41 of one end thereof into the reference bore 42 formed at the bottom surface of the front housing 12. In this state, the outer and inner main clutch plates 19, 20 arranged in the alternate fashion are assembled into the clutch receiving chamber 15 to be engaged respectively with the internal surface of the clutch receiving chamber 15 and the engaging portion 43 of the assembling tool 40. Therefore, it can be realized that after removal of the assembling tool 40 from the front housing 12, the outer and inner main clutch plates 19, 20 can be assembled efficiently and easily to the internal surface of the clutch receiving chamber 15 and the engaging portion 21 of the gear shaft 3 which is then inserted into the space from which the assembling tool 40 has been removed.

Obviously, numerous modifications and variations of the present invention are possible in light of the above teachings. It is therefore to be understood that within the scope of the appended claims, the present invention may be practiced otherwise than as specifically described herein.

What is claimed is:

1. A combination of a drive power transmission device and a differential gear wherein said drive power transmission device for controlling the torque transmission from a propeller shaft to driven wheels through friction engagement of a clutch in a four-wheel drive vehicle is assembled bodily to said differential gear for said driven wheels, said combination comprising:

a bottomed, cylindrical front housing of said drive power transmission device, said front housing having a clutch receiving chamber therein and connected to said propeller shaft;

a gear shaft provided at one shaft end thereof with a drive gear for said differential gear and received at the other shaft end portion thereof in said housing;

said clutch received in said clutch receiving chamber and including a plurality of outer clutch plates engaged with the internal surface of said clutch receiving chamber to be rotatable bodily with said housing but axially movable relative thereto and a plurality of inner clutch plates engaged with an engaging portion formed on said gear shaft to be bodily rotatable with said gear shaft but axially movable relative thereto, said outer clutch plates being arranged in an alternate fashion with respect to said inner clutch plates; and a clutch operating device for bringing said outer and inner clutch plates selectively into and out of friction engagement while pressing at least one of said outer and inner clutch plates against the bottom of the cylindrical front housing.

2. A combination of a drive power transmission device and a differential gear wherein said drive power transmission device for controlling the torque transmission from a propeller shaft to driven wheels through friction engagement of a main clutch in a four-wheel drive vehicle is assembled bodily to said differential gear for said driven wheels, said combination comprising:

a differential case constituting a part of said differential gear;

a gear shaft supported in said differential case rotatably on a rotational axis and provided at one shaft end portion thereof with a drive gear for said differential gear, said gear shaft having the other shaft end portion thereof protruding from an opening end portion of said differential case;

a partition wall portion formed on said differential case and extending from said opening end portion of said differential case in a direction perpendicular to said rotational axis;

a clutch case forming a housing chamber together with said partition wall portion, said clutch case being put on, and secured to, the circumferential edge portion of said partition wall portion;

a bottomed, cylindrical front housing of said drive power transmission device, said front housing having a clutch receiving chamber therein and supported on said clutch case inside said housing chamber to be rotatable on said rotational axis, said front housing being connected to said propeller shaft;

said main clutch received in said clutch receiving chamber and including a plurality of outer main clutch plates engaged with the internal surface of said clutch receiving chamber to be rotatable bodily with said front housing but axially movable relative thereto and a plurality of inner main clutch plates engaged with an engaging portion formed on said gear shaft to be rotatable bodily with said gear shaft but axially movable relative thereto, said outer main clutch plates and said inner main clutch plates being arranged in an alternate fashion with each other;

a rear housing composed of a large-diameter rear housing portion secured to an opening end portion of said front housing, a small-diameter rear housing portion rotatably supported on said shaft end portion of said gear shaft, and an annular intermediate portion made of a non-magnetic material bodily joined at outer and internal surfaces thereof respectively with said large-diameter rear housing portion and said small-diameter rear housing portion;

an armature arranged in said clutch receiving chamber to be rotatable bodily with said front housing but axially movable relative thereto;

a pilot clutch arranged between said rear housing and said armature in said clutch receiving chamber to be pressured by said armature upon said rear housing and including at least one outer pilot clutch plate bodily rotatable with said front housing but axially movable relative thereto and at least one inner pilot clutch plate axially movable relative to said front housing;

a yoke secured to said differential case between said large-diameter rear housing portion and said small-diameter rear housing portion;

an electromagnet held by said yoke for attracting said armature thereby to pressure said outer and inner pilot clutch plates on said rear housing; and a cam-type amplifying mechanism arranged between said main clutch and said rear housing and composed of a first cam member rotatable bodily with said at least one inner pilot clutch plate on said shaft end portion of said gear shaft, a second cam member rotatable bodily with said gear shaft but axially movable relative thereto, and cam followers arranged between the first and second cam members for pressuring said second cam member on said main clutch when the friction engagement in said pilot clutch causes the first cam member to rotate relative to the second cam member thereby to pressure the same upon said main clutch.

3. A method of manufacturing the combination which is constituted as set forth in claim 1, said method comprising the steps of:

forming a reference bore at the bottom surface of said housing coaxially of said rotational axis;

providing an assembling tool having at one end thereof a fitting portion adapted to be inserted into said reference bore and an engaging portion with which said inner clutch plates are engageable to be bodily rotatable but axially movable relative thereto;

inserting said assembling tool at said fitting portion into said reference bore of said housing with the axis of said assembling tool extending coaxially of said rotational axis;

inserting said outer clutch plates and said inner clutch plates successively into said clutch receiving chamber while engaging said outer clutch plates with the internal surface of said clutch receiving chamber and while engaging said inner clutch plates with said engaging portion of said assembling tool;

removing said assembling tool from said housing with said outer and inner clutch plates being received in said housing and being preliminarily pressured on each other; and inserting said gear shaft protruding from said differential gear into the space from which said assembling tool has been removed, while making said inner clutch plates engaged with said engaging portion of said gear shaft so that said inner clutch plates are bodily rotatable with said gear shaft but axially movable relative thereto.

4. A method of manufacturing the combination which is constituted as set forth in claim 2, said method comprising the steps of:

forming a reference bore at the bottom surface of said front housing coaxially of said rotational axis;

providing an assembling tool having at one end thereof a fitting portion adapted to be inserted into said reference bore and an engaging portion with which said inner main clutch plates are engageable to be bodily rotatable but axially movable relative thereto;

inserting said assembling tool at said fitting portion into said reference bore of said front housing with the axis of said assembling tool extending coaxially of said rotational axis;

inserting said outer main clutch plates and said inner main clutch plates successively in said clutch receiving chamber while engaging said outer main clutch plates with the internal surface of said clutch receiving chamber and while engaging said inner main clutch plates with said engaging portion of said assembling tool;

arranging said clutch operating device on said main clutch;

securing said rear housing to said front housing while preliminarily pressuring said main clutch upon said front housing;

removing said assembling tool after securing said rear housing to said front housing; and inserting said gear shaft protruding from said differential gear into the space from which said assembling tool has been removed, while making said inner main clutch plates engaged with said engaging portion of said gear shaft so that said inner main clutch plates are bodily rotatable with said gear shaft but axially movable relative thereto.

* * * * *